April 24, 1928.  
C. W. ROBINSON  
TRACTOR DISK HARROW  
Filed Jan. 7, 1922
1,667,392
2 Sheets-Sheet 1
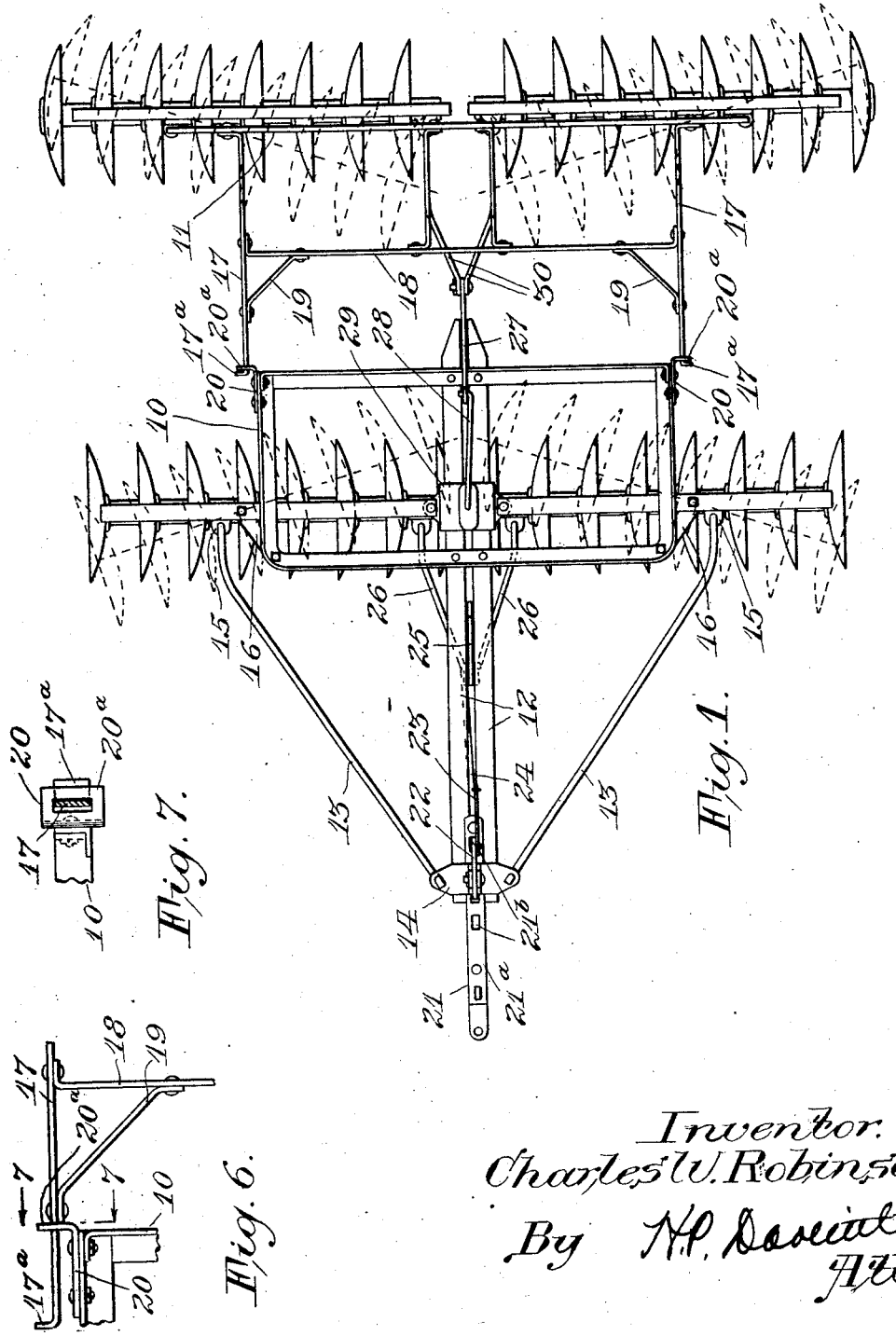
Inventor.
Charles W. Robinson,
By H.P. Davis
Atty.

April 24, 1928.
C. W. ROBINSON
TRACTOR DISK HARROW
Filed Jan. 7, 1922
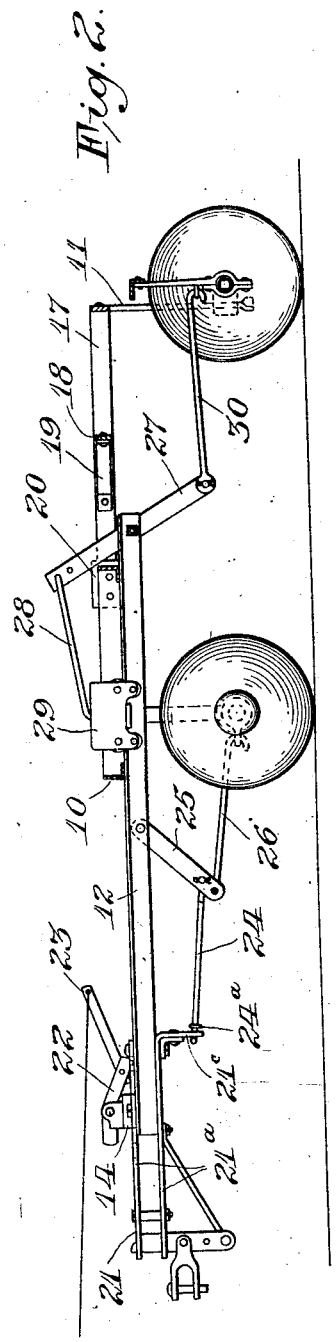
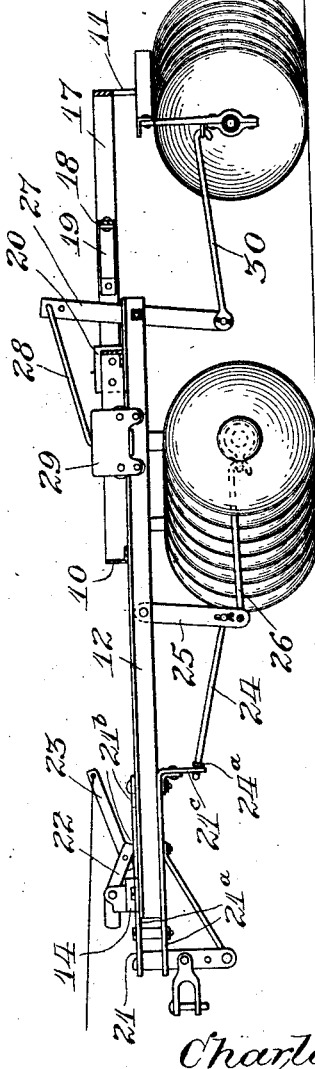
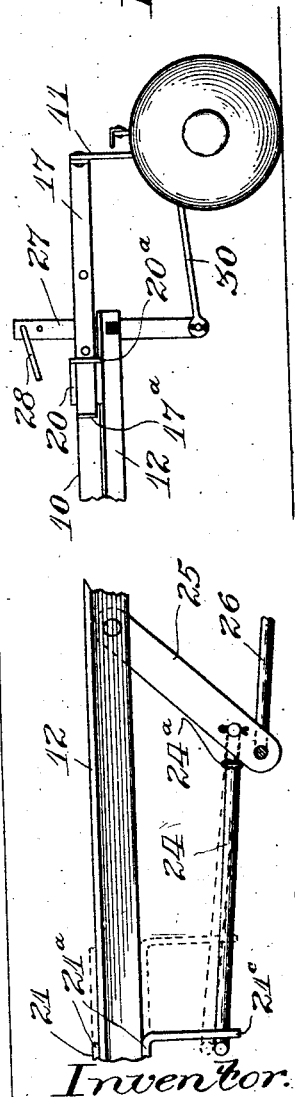
Inventor.
Charles W. Robinson,
By H. P. Doolittle,
Atty Patented Apr. 24, 1928.

1,667,392

UNITED STATES PATENT OFFICE.

CHARLES W. ROBINSON, OF AUBURN, NEW YORK, ASSIGNOR TO INTERNATIONAL HARVESTER COMPANY, OF CHICAGO, ILLINOIS, A CORPORATION OF NEW JERSEY.

TRACTOR DISK HARROW.

Application filed January 7, 1922. Serial No. 527,578.

This invention relates to double or tandem disk harrows of the type adapted for operation by a tractor.

The objects of the invention are to improve and simplify the construction of the mechanism through which the position of the disk gangs is controlled by forward and backward movement of the tractor, and to incorporate in said mechanism a device by which the tractor can be made to either positively angle the gangs by direct action in backing or is allowed to back without direct action on the gangs but so affects the angling mechanism that the gangs will assume a working angle when the harrow is next moved forwardly. Also, to combine with such mechanism a novel form of connection between the front and rear frames intended to prevent side sway of the rear section of the harrow during operation while permitting a certain degree of flexibility during a turn of the harrow in either direction.

The foregoing objects are accomplished by including in the gang angling mechanism a reversible coupling rod, either end of which may be connected to a sliding draft head, one end of the rod having means whereby the connection with the draft head remains fixed while the other end, without such means, permits the draft head to slide longitudinally of the coupling rod, thus giving a choice of two ways for operating the gang angling mechanism, and also by connecting the two sections of the harrow by a novel form of telescopic coupling located at the outer ends of the frames and co-operating with the draft angling means in a manner to straighten the rear gangs when the harrow is being backed.

The main objects stated, as well as incidental improvements which will appear from the following description, are attained by the organization and details of construction or their equivalents set forth in the following specification and defined in the claims.

Referring to the drawings—

Figure 1 is a plan view of a harrow embodying my invention;

Fig. 2 is a side elevation with the gangs in straight or non-working position;

Fig. 3 is a similar view with the gangs in working position;

Fig. 4 is an enlarged detail view of a portion of the front of the harrow;

Fig. 5 is a detail view of a portion of the rear of the harrow;

Fig. 6 is an enlarged detail view of one draft coupling between the harrow sections; and Fig. 7 is a section taken on line 7—7 of Fig. 6.

My invention is disclosed in connection with a tandem harrow having a front frame 10 and a rear frame 11, each carrying the usual pair of pivoted disk gangs. The front section 10 has a pair of central angle members 12 which project forwardly to form the draft tongue, and the forward ends of these tongue angles are connected to the front gangs by means of rods 13, the front ends of which engage openings in a plate 14 on the tongue angles and the rear ends are pivoted on lugs 15 formed on the bearings for the front gangs. The front gangs are connected to the frame 10 through the medium of links 16, which are pivoted to the frame 10 and to the gang frame in a manner to permit a certain amount of lateral movement of the two gangs when they are being swung to and from angled position. The rear frame 11 is formed with forwardly projecting side bars 17 braced by a transverse member 18 and diagonal braces 19, and the forward ends of the members 17 are received in brackets 20 fixed to the rear corners of the front frame 10. These brackets are formed with outwardly extending angular portions 20$^a$, which are provided with apertures extending in a fore and aft direction in which the members 17 are slidably received, these members having their ends outturned as at 17$^a$ to limit their rearward movement. This construction permits the front and rear sections of the harrow to approach each other when the harrow is backed, as the extension 17 will then slide through the apertures in the extensions 20$^a$ of brackets 20 until this bracket comes in contact with the end of the diagonal brace 19 which acts as a stop, as seen in Fig. 6. Also, when the harrow is turning the side toward which the turn is made will telescope and the draft will be transmitted through the coupling on the opposite side, the apertures in the extensions 20$^a$ being of sufficient size to permit such action. This construction provides a substantially fixed connection between the harrow sections, so far as side sway is concerned, while the harrow is moving forwardly, but allows a certain degree of flexibility between the sections during a turn.

The gang angling mechanism which I associate with the above described coupling comprises a sliding draft head 21 mounted on the forward ends of the tongue angles 12. This is preferably formed of upper and lower flat bars 21ª, the forward ends of which carry a draft clevis of any preferred form. The upper bar is formed with at least two square perforations 21ᵇ adapted to be engaged by a latch member 22 pivoted on the plate 14 and operated by lever 23, which is pivoted to latch 22 near its end and has a portion projecting beneath it in a manner to act as a cam which lifts the end of latch 22 when the lever 23 is pulled forward by the operating cord attached to its opposite end. This latch 22 is adapted to engage in either one of the apertures 21ᵇ and prevent the forward movement of draft head 21, as for instance, when it has been backed to the position shown in Fig. 3. The rear end of the lower bar 21ª has a downward extension forming a flat plate as at 21ᶜ, which is provided with an opening in which is received the forward end of a coupling rod 24 which has its rear end bent laterally and pivotally received in a depending link 25 where it is retained by a cotter pin. The link 25 is free to swing forward and back on the tongue angles, and is connected at its lower end by means of links 26 to the inner ends of the front gangs. The coupling rod 24 has a similar lateral extension or hook at each end, either of which may be passed through the opening in the down-turned end 21ᶜ of the draft head and the other end connected to the depending link 25 as above described, that is to say, this rod is reversible. One end of the rod, however, is provided near the angle bend with an integral stop collar 24ª, which is of such size as to prevent the rod from sliding through the opening in the draft head extension 21ᶜ.

It results from this construction that when the rod is arranged, as shown in Figs. 2 and 3, backward movement of the draft head 21 will cause it to engage the stop collar 24ª and positively push the coupling rod 24 backwardly, communicating the same movement to the links 25 and 26 and to the front gangs so that when the draft head is at its limit of movement, as in Fig. 3, the front gangs will have been positively angled. On the other hand, if the link is in the reverse position shown in Fig. 4 the draft head will slide backwardly on the rod 24 without affecting the gangs until it reaches the position illustrated in dotted lines in Fig. 4, where it becomes locked, and on the next forward movement of the tractor and harrow the resistance of the soil will cause the inner ends of the front gangs to swing backwardly and rod 24 to slide rearwardly on the extension 21ᶜ until stopped by the hooked end when the gangs will have assumed the working angle set by backing the draft head. In order to communicate the angling movement to the rear gangs a lever 27 is pivoted intermediate its ends on the rear ends of the tongue angles 12, and the upper end of this lever is connected by a link 28 with a saddle member 29 which connects the inner ends of the front gang frames and which rides on the upper side of the tongue angles as the front gangs are angled or straightened. The lower end of lever 27 is connected by links 30 with the inner ends of the rear gangs. By this arrangement the rear gangs are moved in an opposite direction to the front gangs as the draft head is moved forward or back, and all the gangs are thus given simultaneous control.

It will also be evident that when the gangs are in angled position, as shown in the dotted lines of Fig. 1 or full lines in Fig. 3, backing of the harrow will, by reason of the telescopic connections above described, cause the links 30 to push the inner ends of the rear gangs backwardly, causing them to straighten and the rear gangs will remain in straightened position as long as the harrow is being backed, and will again assume their angled position when the harrow moves forward and the rear section assumes its normal position. If the coupling rod 24 is connected as shown in Fig. 4 the front gangs will of course straighten also when the harrow is backed as the rod 24 can then slide freely in the draft head, but the rear gangs will straighten irrespective of the adjustment of the coupling rod 24, and this is of material assistance when backing the harrow out of bad positions.

What I claim as my invention is:

1. In a harrow, front and rear angular frames, couplings between the frames comprising straight rigid members fixed to the outer ends of one frame and projecting towards the second frame, brackets secured to the outer ends of the second frame and provided with projecting portions having fore and aft openings in which said members are loosely received, and means permitting limited longitudinal movement of said members within said openings.

2. In a harrow, front and rear frames, pivotally mounted disk gangs on each frame, means for shifting the front gangs to and from working angles, a lever pivoted intermediate its ends on the front frame at a point behind the gangs, a link connecting the upper end of said lever with the front gangs for movement therewith, a link between the lower end of said lever and the gangs on the rear frame, and telescopically related couplings between the frames.

3. In a harrow, front and rear frames, laterally projecting brackets on the outer ends of the front frame formed with apertures extending in a fore and aft direction, and forwardly extending rigid bars on the outer ends of the rear frame received in said apertures and movable therethrough, said bars having stops limiting said movement.

4. In a disk harrow, a frame, a plurality of disk gangs pivotally associated with the frame, gang angling devices including a member slidable relative to the frame and formed with a vertical plate having an opening, a member forming a part of operative connections between said plate and the disk gangs, said member constituting a reversible coupling rod one end of which is formed with stops adapted to engage the opposite faces of the plate and providing a relatively fixed connection with said plate, the other end of said coupling rod being formed with a single stop adapted to engage the front face of the plate so as to provide a slidable connection therewith when the rod is reversed.

5. A disk harrow comprising a frame, a plurality of disk gangs pivotally connected thereto, gang angling devices including a member reciprocably movable relative to the frame, connecting means between said member and the disk gangs including an extension on the reciprocably movable member, said extension being provided with an opening, links connected to the gangs, and a reversible coupling member having one end connected to the links and its other end received in said opening, both ends of the coupling member being formed with laterally extending extensions, the rod also having an integral enlargement thereon near one end, said enlargement being adapted to prevent longitudinal movement of the rod relative to said extension of said reciprocable member when the coupling member is in one position of adjustment.

6. A tandem disk harrow comprising front and rear harrow frames, a plurality of disk gangs pivotally connected to each frame, relatively movable members affording draft connections between said frames, gang angling devices including a member reciprocably movable relative to the front harrow frame, connecting means between said reciprocably movable member and said disk gangs, said connecting means including an extension of the reciprocably movable member, said extension being provided with an opening, connecting devices between the inner ends of the front and rear pairs of gangs, links connected to the inner ends of the front gangs and extending forwardly therefrom, and a reversible coupling rod having one end connected to the links and its other end received in said opening, both ends of the coupling rod being formed with laterally extending extensions, the rod also having an integral enlargement thereon near one of said extensions, said enlargement substantially preventing longitudinal movement of the rod relative to said extension of the said reciprocable member.

7. In a disk harrow, a harrow frame, disk gangs, and draft governed devices for controlling the angling and straightening of the gangs, said devices including a unitary reversible rod having means formed thereon which in one position of adjustment of the rod enables the gangs to be positively angled by a backward thrust transmitted to the gangs through said unitary reversible rod and in another position of adjustment of the rod provides a lost motion connection which determines the angles which the gangs may be made to assume upon the application of a forwardly directed pull to the harrow.

In testimony whereof I affix my signature.

CHARLES W. ROBINSON.